(12) United States Patent
Tanaka et al.

(10) Patent No.: US 10,086,926 B2
(45) Date of Patent: Oct. 2, 2018

(54) VORTEX GENERATING APPARATUS AND VORTEX GENERATING METHOD

(71) Applicant: KABUSHIKI KAISHA TOSHIBA, Minato-ku (JP)

(72) Inventors: Motofumi Tanaka, Yokohama (JP); Toshiki Osako, Kawasaki (JP); Kazunori Shioda, Minato-ku (JP); Hisashi Matsuda, Shinagawa-ku (JP); Tatsuro Uchida, Chofu (JP); Naohiko Shimura, Atsugi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 436 days.

(21) Appl. No.: 14/167,254

(22) Filed: Jan. 29, 2014

(65) Prior Publication Data
US 2014/0217240 A1     Aug. 7, 2014

(30) Foreign Application Priority Data

Feb. 1, 2013   (JP) .................................. 2013-018970

(51) Int. Cl.
*B64C 21/00* (2006.01)
*B64C 23/06* (2006.01)

(52) U.S. Cl.
CPC .............. *B64C 21/00* (2013.01); *B64C 23/06* (2013.01); *Y02E 10/72* (2013.01); *Y02T 50/162* (2013.01)

(58) Field of Classification Search
CPC ....... B64C 21/00; B64C 23/06; B64C 23/005; Y02T 50/16; Y02T 50/166
See application file for complete search history.

(56) References Cited

U.S. PATENT DOCUMENTS 3,578,264 A * 5/1971 Kuethe ................... B64C 21/10
                                                                    181/220
5,016,837 A * 5/1991 Willis ..................... B64C 21/04
                                                                    244/12.1

(Continued)

FOREIGN PATENT DOCUMENTS

EP     0 887 257 A2    12/1998
EP     2 031 243 A1     3/2009

(Continued)

OTHER PUBLICATIONS

Machine translation of JP 4810342, taken from Japan Platform for Patent Information, <https://www4.j-platpat.inpit.go.jp/cgi-bin/tran_web_cgi_ejje?u=http://www4.j-platpat.inpit.go.jp/eng/translation/20160320133721631321477407214612 24E3D3FED82291A5A1DAC3799DAA394A41>.*

(Continued)

*Primary Examiner* — Michael H Wang
(74) *Attorney, Agent, or Firm* — Oblon, McCelland, Maier & Neeustadt, L.L.P.

(57) ABSTRACT

A vortex generating apparatus includes: a member to contact with a flow of a fluid to form a stagnation point and a first and a second separation points on a periphery of a cross section of the member parallel to the flow; a disturbance applying unit to apply a disturbance to an upstream side of the first separation point to cause part of a boundary layer of the flow to adhere; and a controller to temporally control the application of the disturbance to change an adhesion distance from the stagnation point to the first separation point so as to generate a dynamic stall vortex.

14 Claims, 12 Drawing Sheets

(56) References Cited

U.S. PATENT DOCUMENTS

| | | | | |
|---|---|---|---|---|
| 6,267,331 | B1* | 7/2001 | Wygnanski | B64C 21/04 244/204 |
| 7,017,863 | B2* | 3/2006 | Scott | B64C 23/005 244/205 |
| 7,624,941 | B1* | 12/2009 | Patel | B62D 35/007 244/200.1 |
| 7,744,039 | B2* | 6/2010 | Miles | B64C 23/005 244/205 |
| 8,308,112 | B2* | 11/2012 | Wood | B64C 23/005 244/203 |
| 8,403,271 | B2* | 3/2013 | Domel | B64C 21/10 244/198 |
| 8,827,211 | B2* | 9/2014 | Kremeyer | B64C 19/00 244/201 |
| 2004/0118973 | A1* | 6/2004 | Malmuth | B64C 5/12 244/75.1 |
| 2009/0173837 | A1* | 7/2009 | Silkey | B64C 23/005 244/205 |
| 2009/0212164 | A1* | 8/2009 | Osborne | B64C 23/005 244/205 |
| 2010/0209257 | A1 | 8/2010 | Fuglsang et al. | |
| 2010/0329838 | A1* | 12/2010 | Greenblatt | B64C 23/005 415/1 |
| 2011/0180149 | A1* | 7/2011 | Fine | B01J 21/063 137/1 |
| 2011/0210211 | A1* | 9/2011 | Zha | B64C 21/025 244/208 |
| 2012/0287549 | A1* | 11/2012 | Tanaka | F03D 7/022 361/131 |
| 2012/0291874 | A1 | 11/2012 | Tanaka et al. | |
| 2013/0001368 | A1 | 1/2013 | Silkey et al. | |

FOREIGN PATENT DOCUMENTS

| | | | |
|---|---|---|---|
| JP | 2008-25434 | 2/2008 | |
| JP | 4810342 B2 * | 11/2011 | F03D 7/04 |
| JP | 2012-241732 | 12/2012 | |
| JP | 2012-253025 | 12/2012 | |
| WO | WO 2006/027630 A2 | 3/2006 | |
| WO | WO 2006/027630 A3 | 3/2006 | |

OTHER PUBLICATIONS

Post, Martiqua L., and Thomas C. Corke, "Separation Control Using Plasma Actuators: Dynamic Stall Vortex Control on Oscillating Airfoil", Dec. 2006, AIAA Journal, vol. 44, No. 12, pp. 3125-3135.*

The Extended European Search Report dated Jul. 30, 2014, in Application No. / Patent No. 14153570.8-1754 / 2769912.

Japanese Office Action dated Nov. 29, 2016 for Japanese Application No. 2014-015831 and English translation of relevant portions thereof.

* cited by examiner

VORTEX GENERATING APPARATUS AND VORTEX GENERATING METHOD

CROSS REFERENCE TO RELATED APPLICATION

This application is based upon and claims the benefit of priority from Japanese Patent Application No. 2013-018970, filed on Feb. 1, 2013; the entire contents of which are incorporated herein by reference.

FIELD

Embodiments described herein relate generally to a vortex generating apparatus and a vortex generating method.

BACKGROUND

In fluid dynamics, DSV (Dynamic Stall Vortex) is known. The dynamic stall vortex is generated, for example, when an angle of attack of a wing to a flow of a fluid is oscillated across a static stall angle. In this case, even when the angle of attack exceeds the static stall angle, a dynamic lift does not decrease (a stall does not occur) but increases. At this time, the dynamic stall vortex is generated, and it is thought that a great dynamic lift is generated due to a negative pressure of this vortex.

However, when the angle of attack of the wing is increased to a certain degree or more exceeding the static stall angle, the dynamic lift, after reaching the maximum, rapidly decreases, resulting in a complete stall. At this time, the dynamic stall vortex is not generated, and therefore there occurs a state where no negative pressure due to the dynamic stall vortex exists.

As described above, the dynamic stall vortex generates a large dynamic lift and on the other hand becomes a cause of instability of the dynamic lift. Therefore, in technical fields using the dynamic lift to wings, such as an aircraft (a fixed-wing aircraft, a rotary-wing aircraft, or the like), a windmill, and the like, designs are generally made so that the angle of attack of the wing becomes sufficiently smaller than the stall angle in order to prevent the occurrence of a dynamic stall (in other words, in order to prevent the generation of a dynamic stall vortex).

However, if the generation of the dynamic stall vortex can be controlled, it is possible to perform various kinds of processes (for example, the application of a force to an object, the promotion of the mixture of gases) by utilizing characteristics of the dynamic stall vortex (a high non-steady negative pressure and so on).

DETAILED DESCRIPTION

A vortex generating apparatus, includes: a member configured to contact with a flow of a fluid to have a stagnation point and a first and a second separation points on a periphery of a cross section of the member parallel to the flow, at the stagnation point the fluid flowing in, and the first and the second separation points being followed by a first and a second separation region respectively; a disturbance applying unit configured to apply a disturbance to an upstream side of the first separation point to cause part of a boundary layer of the flow to adhere; and a controller configured to temporally control the application of the disturbance by the disturbance applying unit to change a position of the first separation point, change an adhesion distance from the stagnation point to the first separation point, and swing the boundary layer so as to generate a dynamic stall vortex in the separation region, the dynamic stall vortex having an axis in a wing span direction of the member.

Hereinafter, embodiments will be described in detail with reference to the drawings.

(Vortex during Dynamic Stall)

First, a vortex generated during a dynamic stall (DSV (Dynamic Stall Vortex)) will be described. In the embodiments described later, it is possible to generate a vortex VR corresponding to the dynamic stall vortex DSV.

Figure 1:
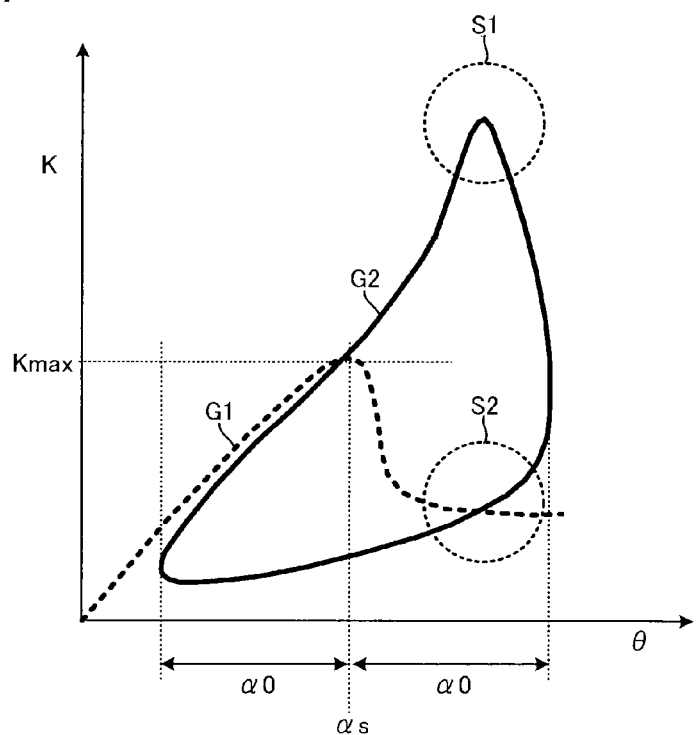
FIG. 1 is a graph showing a relation between an angle θ of attack and a lift coefficient K.

FIG. 1 is a graph showing a relation between an angle $\theta$ of attack of a wing W (an angle made by a wing chord line and a uniform flow) and a lift coefficient K. Graphs G1, G2 correspond to a static wing W (a case where the angle $\theta$ of attack is constant or changes at a relatively low rate) and a dynamic wing W (a case where the angle $\theta$ of attack changes at a relatively high rate) respectively.

Figure 2A:
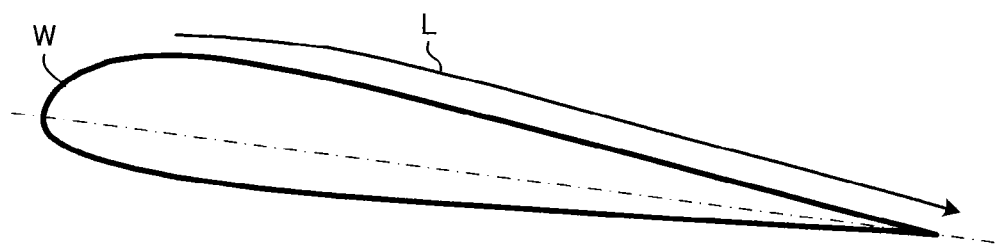
FIG. 2A is a schematic view showing an example of a relation between a wing W and a boundary layer L.
Figure 2B:
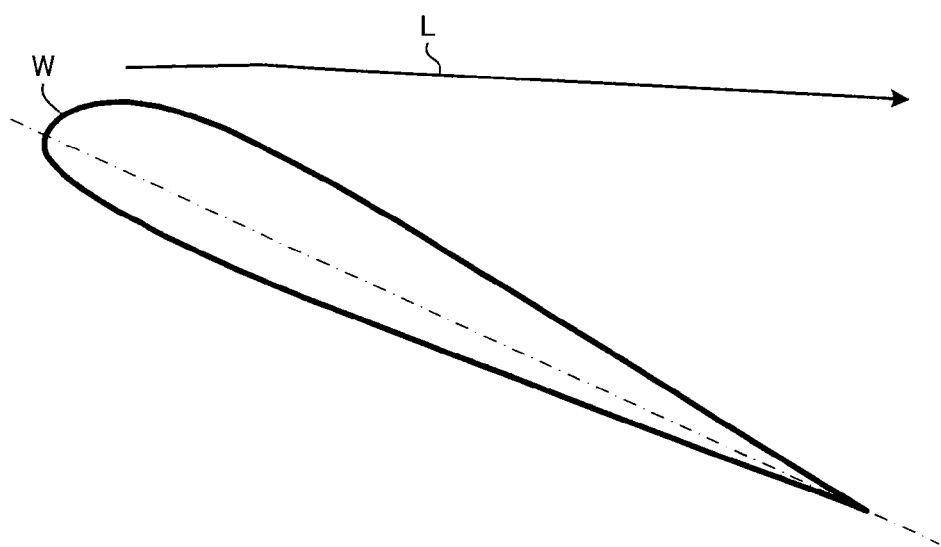
FIG. 2B is a schematic view showing an example of a relation between the wing W and the boundary layer L.

When the wing W is static (graph G1), a static stall occurs. In a region where the angle $\theta$ of attack is smaller than a stall angle $\alpha s$, the lift coefficient K (dynamic lift) increases substantially in proportion to the angle $\theta$ of attack. At this time, a boundary layer L of a flow is disposed along a rear surface (negative-pressure surface) of the wing W as shown in FIG. 2A. When the angle $\theta$ of attack is further increased to reach the stall angle $\alpha s$, the lift coefficient K rapidly decreases (stall). At this time, as shown in FIG. 2B, the boundary layer L separates from the rear surface of the wing W (separated shear layer), which becomes a cause of decreasing the lift coefficient K. That is, there is produced a state where a negative pressure due to the flow is not applied to the wing W.

On the other hand, when the wing W is dynamic (graph G2), a dynamic stall occurs. Here, a wing W having the same shape as the static wing is used and the angle $\theta$ of attack is sinusoidally oscillated within a range of $\pm \alpha 0$ with respect to the stall angle $\alpha s$.

When the angle $\theta$ of attack is increased, starting from the angle $\theta$ of attack=$(\alpha s - \alpha 0)$, the lift coefficient K increases. Even when the angle $\theta$ of attack reaches the stall angle $\alpha s$, the lift coefficient K does not decrease. On the contrary, the lift coefficient K at this time greatly increases as compared with a maximum lift coefficient Kmax in a static field, and reaches the maximum point (state S1).

However, when the angle $\theta$ of attack is further increased, the lift coefficient K greatly decreases, resulting in a complete stall state (state S2). After the complete stall is reached, even when the angle $\theta$ of attack is decreased, the lift coefficient K changes in a low state. When the angle $\theta$ of attack is sufficiently decreased, the lift coefficient K approaches the lift coefficient K in the static field.

Figure 2C:
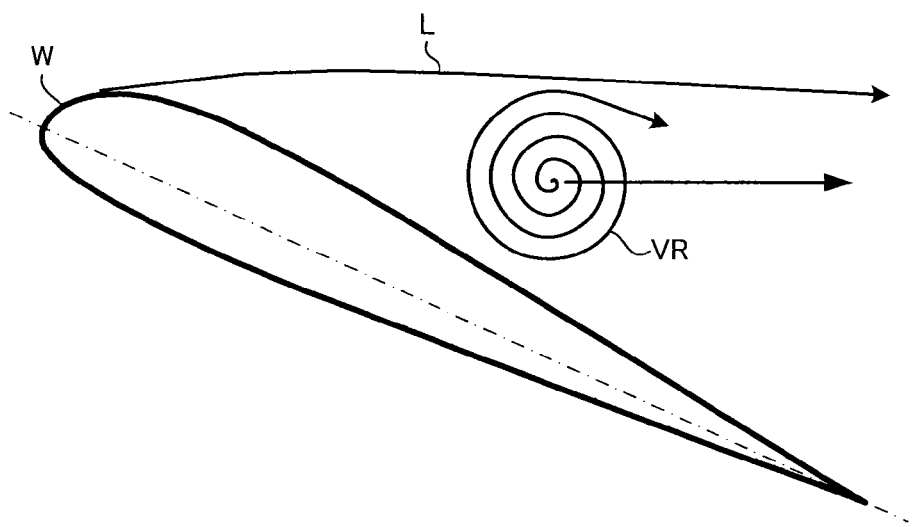
FIG. 2C is a schematic view showing an example of a relation between the wing W and the boundary layer L.

As shown in FIG. 2C, in the state S1, near a leading edge of the wing W, the dynamic stall vortex DSV having large vorticity whose sign is the same as that of vorticity of the separated shear layer (boundary layer L) is generated. The generated dynamic stall vortex DSV flows in a mainstream direction.

It is thought that, since the dynamic stall vortex DSV has a great negative pressure, the rear surface of the wing W is lifted upward, and a great dynamic lift is generated. However, when the dynamic stall vortex DSV passes the rear surface of the wing W and flows away rearward, the flow turns into the state shown in FIG. 2B. At this time, the dynamic lift rapidly decreases as shown in the state S2 in FIG. 1.

As described above, the dynamic stall vortex DSV is generated when the angle $\theta$ of attack of the wing W is changed, and not only brings about a great dynamic lift but also becomes a cause of instability of the dynamic lift. In the embodiments below, it is possible to generate a vortex VR corresponding to the dynamic stall vortex DSV without dynamically changing the angle $\theta$ of attack of the wing W.

(First Embodiment)

Figure 3:
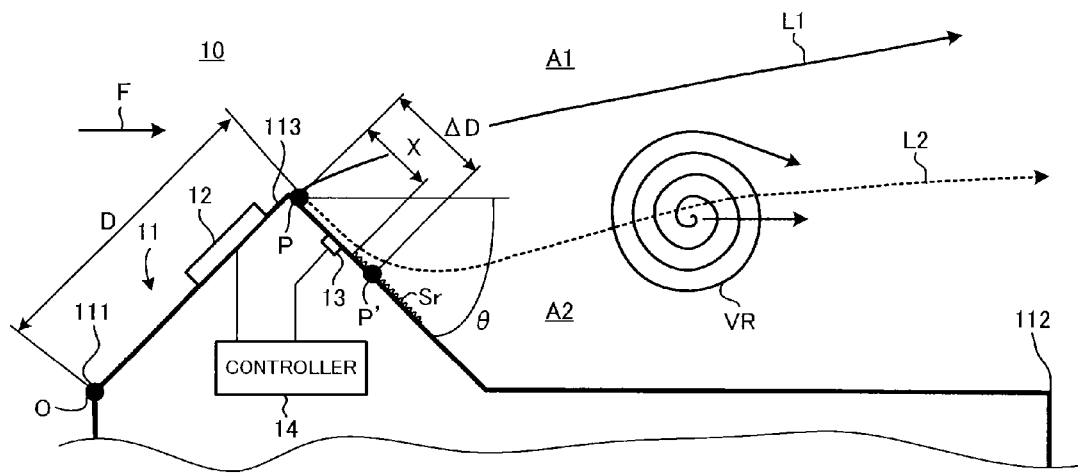
FIG. 3 is a schematic view showing a vortex generating apparatus 10 according to a first embodiment.

As shown in FIG. 3, a vortex generating apparatus 10 according to a first embodiment is an apparatus which generates a vortex VR when disposed in a flow of a fluid F, and has a wing member 11, a disturbance applying unit 12, a flow velocity measuring unit 13, and a controller 14.

The fluid F is, for example, gas such as the atmosphere, inert gas (rare gas (for example, argon gas), nitrogen gas), reactive gas (combustible gas (for example, fuel gas), oxidizing gas (for example, oxygen gas)), and carbon dioxide gas, or a mixture of these gases.

The vortex VR is a spiral pattern which is generated by the rotation of the fluid F and corresponds to a dynamic stall vortex DSV. As will be described later, the wing member 11 is disposed in the flow of the fluid F and is kept in a static stall state, and the flow of the fluid F is disturbed by the disturbance applying unit 12, whereby the vortex VR is generated.

The wing member 11 has a leading edge 111, a trailing edge 112, and a projection 113. Here, a lower portion of the wing member 11 is omitted. That is, the shape of the lower portion of the wing member 11 is not particularly limited here. Note that the wing member 11 has a wing span in a direction perpendicular to the paper.

The leading edge 111 and the trailing edge 112 are portions disposed on the most upstream side and the most downstream side of the wing member 11 respectively. That is, the fluid F flows in from the leading edge 111 and flows out from the trailing edge 113 on the wing member 11.

The projection 113 is disposed between the leading edge 111 and the trailing edge 112 and is a projecting portion. In this embodiment, the projection 113 has an acute-angled corner portion, and even when the angle of attack is changed, a later-described separation point P is fixed to the corner portion of the projection 113. Here, a rough surface Sr is formed on the projection 113 from the separation point P along a downstream direction of the flow. That is, the surface of the projection 113 is roughened. This enhances an effect of a later-described disturbance by the disturbance applying unit 12 and promotes a boundary layer L (separated shear layer) to become a turbulent flow. As a result, the elongation of an adhesion distance D of the boundary layer L during the operation of the disturbance applying unit 12 is facilitated. Note that a distance along the surface from a stagnation point O at which the fluid F flows in up to the separation point P is defined as the adhesion distance D as shown in FIG. 3.

Since the effect of the disturbance applied by the disturbance applying unit 12 is increased due to an influence that the rough surface Sr has on the flow, a difference in the adhesion distance D depending on whether or not the disturbance is applied increases. As a result, it is possible to release a stronger vortex VR. However, the rough surface Sr is preferably apart from the separation point P by a certain distance X. If the distance X=0, even when the disturbance applying unit 12 is OFF, the rough surface Sr influences the flow, which may make it difficult to keep the adhesion distance D small. That is, the difference in the adhesion distance D depending on whether or not the disturbance is applied becomes small, and it is difficult to release the strong vortex VR.

It is assumed that, from the projection 113 to the trailing edge 112, the angle $\theta$ of attack of the wing member 11 is larger than a stall angle $\alpha$. That is, the wing member 11 is in a static stall state.

At this time, near the wing member 11, the boundary layer L (L1) which separates a high-velocity region A1 and a low-velocity region A2 from each other exists. The high-velocity region A1 is a region where a relatively high-speed mainstream of the fluid F flows. The low-velocity region A2 is a separation region where the mainstream of the fluid F does not flow, and the flow velocity of the fluid F in the low-velocity region A2 is lower than the flow velocity of the mainstream.

In the stall state, the boundary layer L1 of the fluid F separates from the surface of the wing member 11 at the separation point P disposed on the projection 113. Due to the separation of the boundary layer L, a negative pressure given by the fluid F to an upper surface of the wing member 11 is decreased and a lift coefficient K decreases.

The separated boundary layer L1 becomes a separated shear layer and has velocity distribution covering the high-velocity region A1 to the low-velocity region A2. As a result of this velocity distribution, a shear force is generated in the separated shear layer (boundary layer L). As a result of the shear force, the flow of the fluid F in the boundary layer L1 comes to have vorticity (rotating component).

The disturbance applying unit 12 is disposed on the wing member 11 on an upstream side of the separation point P and applies the disturbance to the boundary layer L1 (separated shear layer). The application of the disturbance makes it possible for the boundary layer L separated at the separation point P to partly adhere. The partial adhesion is not adhesion from the separation point up to the trailing edge 112 but means that the adhesion from the separation point up to a certain distance is enough. After the partial adhesion due to the effect of the application of the disturbance, the separation may take place again. Even in such a case, changing the magnitude of the adhesion distance D by the presence and absence of the application of the disturbance makes it possible to release the vortex VR.

The boundary layer L1 when the disturbance applying unit 12 is OFF separates from the wing member 11 at the separation point P and is not adhering to the wing member 11 between the separation point P and the trailing edge 112. On the other hand, a boundary layer L2 when the disturbance applying unit 12 is ON is separated from the wing member 11 at a position (separation point P') apart from the separation point P by a distance ΔD. In this manner, changing the disturbance applying unit 12 between OFF and ON results in a change between the boundary layers L1, L2 to generate the vortex VR. Details will be described later.

The disturbance applying unit 12 is capable of applying the disturbance by various methods such as discharge, vibration, and an acoustic wave.

(1) Application of Disturbance by Discharge

Figure 4A:
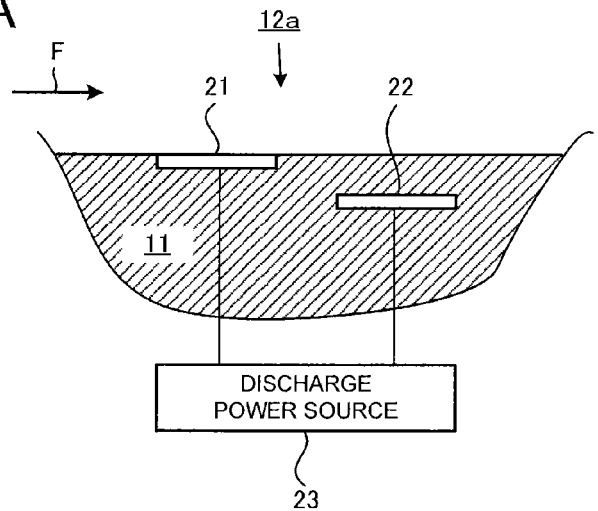
FIG. 4A is a schematic view showing an example of an internal structure of a disturbance applying unit 12.

FIG. 4A shows an example of a disturbance applying unit 12a using discharge.

The disturbance applying unit 12a has electrodes 21, 22 and a discharge power source 23. The electrodes 21, 22 are disposed on or inside the wing member 11.

Here, a surface (upper surface) of the electrode 21 is flush with the surface of the wing member 11. That is, the surface of the electrode 21 is in contact with the fluid F. However, the electrode 21 may be buried in the wing member 11 so that its surface is not exposed.

The electrode 22 is disposed to be deviated from the electrode 21 in a direction of the flow of the fluid F and is buried in the wing member 11. The electrode 22 is buried deeper from the surface of the wing member 11 than the electrode 21.

The discharge power source 23 applies a voltage (for example, an AC voltage (as an example, a sine-wave voltage)) between the electrodes 21, 22. The application of the voltage between the electrodes 21, 22 causes the generation of the discharge (here, a dielectric barrier discharge) between the electrodes 21, 22. Due to this discharge, the disturbance is applied to the separated shear layer (boundary layer L).

Here, the electrodes 21, 22 are provided on the wing member 11. Therefore, the wing member 11 is made of a dielectric material. The dielectric material is not particularly limited and is a known solid dielectric material. As this dielectric material, an inorganic insulating material such as alumina, glass, or mica or an organic insulating material such as polyimide, glass epoxy, or rubber can be appropriately selected for use, for instance.

The discharge power source 23 applies the voltage between the electrodes 21, 22 to generate the discharge (here the dielectric barrier discharge) of the fluid F. Specifically, molecules of the fluid F separate into ions and electrons to become plasma. The ions are accelerated in an electric field between the electrodes 21, 22, and their force is transmitted to the fluid, so that a plasma-induced flow along the surface is generated.

When the high AC voltage is applied between the electrodes 21, 22, a velocity change corresponding to a period of this alternation is induced in the fluid, so that the disturbance is applied to the boundary layer L of the fluid F.

In time average, the plasma-induced flow from the exposed (or shallowly buried) electrode 21 toward the covered (or deeply buried) electrode 22 is generated.

When the electrodes 21, 22 are disposed on an upstream side and a downstream side respectively, the direction in which the fluid F flows and a direction of the flow induced by the discharge agree with each other. On the other hand, when the electrodes 21, 22 are disposed on the downstream side and the upstream side respectively, the direction in which the fluid flows and the direction of the flow induced by the discharge become opposite.

In either case, the disturbance can be applied to the separated shear layer (boundary layer L1).

By applying the disturbance to the boundary layer L of the fluid F by the plasma-induced flow whose direction is perpendicular to the direction in which the fluid F flows, it is possible to generate the vortex VR. In this case, a line connecting the electrodes 21, 22 becomes perpendicular to the direction in which the fluid F flows.

To whichever direction the direction of the plasma-induced flow is set relative to the direction in which the fluid F flows (for example, a 45° direction), it is possible to generate the vortex VR.

(2) Application of Disturbance by Vibration

Figure 4B:
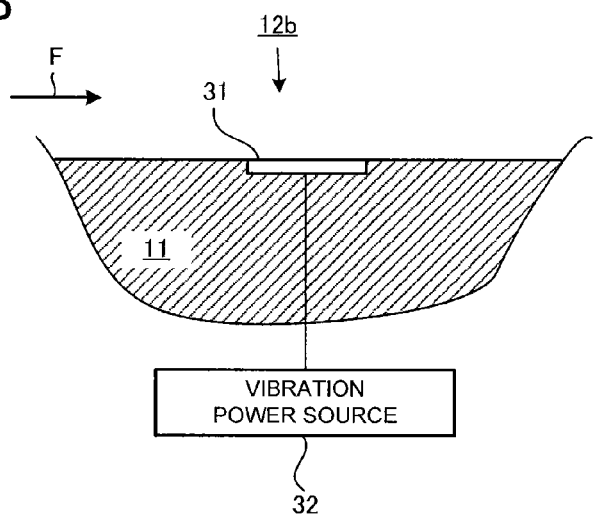
FIG. 4B is a schematic view showing an example of the internal structure of the disturbance applying unit 12.

FIG. 4B shows an example of a disturbance applying unit 12b using vibration. The disturbance applying unit 12b has a vibrator 31 and a vibration power source 32.

The vibrator 31 is disposed on or inside the wing member 11. Here, a surface (upper surface) of the vibrator 31 is flush with the surface of the wing member 11. However, the vibrator 31 may be buried in the wing member 11 so that its surface is not exposed.

The vibration power source 32 applies an AC voltage (for example, a sine-wave voltage) to the vibrator 31. The application of the AC voltage to the vibrator 31 causes the vibrator 31 to vibrate. Due to this vibration, the disturbance is applied to the separated shear layer (boundary layer L1).

(3) Application of Disturbance by Acoustic Wave

Figure 4C:
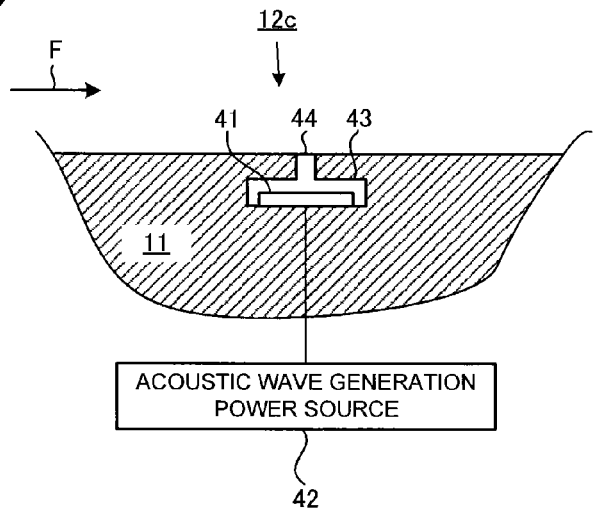
FIG. 4C is a schematic view showing an example of the internal structure of the disturbance applying unit 12.

FIG. 4C shows an example of a disturbance applying unit 12c using an acoustic wave. The disturbance applying unit 12c has an acoustic wave generator 41 and an acoustic wave generation power source 42.

The acoustic wave generator 41 is, for example, a speaker and is disposed in a cavity 43 in the wing member 11.

The acoustic wave generation power source 42 applies an AC voltage (for example, a sine-wave voltage) to the acoustic wave generator 41. The application of the AC voltage to the acoustic wave generator 41 causes the acoustic wave generator 41 to generate the acoustic wave, and the acoustic wave is released from an opening 44 of the cavity 43. Due to this acoustic wave, the disturbance is applied to the separated shear layer (boundary layer L).

(Elongation of Adhesion Distance D by Disturbance)

Next, a change of the adhesion distance D due to the application of the disturbance to the boundary layer (separated shear layer) will be described.

When the angle θ of attack of the wing member 11 is large, transverse vortices (vortices having an axis in a wing length direction) are generated when the flow of the fluid F passes the projection 113 and the transverse vortices are intermittently released in the flow direction. A flow field in this state is in a non-steady state where it alternately repeats an adhering state and a separated state on the downstream side of the projection 113.

As the transverse vortices flow downstream, they merge to grow, so that the boundary layer L becomes thick, and at the separation point P, they are released as large-scale separation bubbles, and the boundary layer L is separated (the formation of the separated shear layer). A position of the separation point P is determined by the shape of the wing member 11, the velocity of the mainstream, and the like.

When the disturbance is applied by the disturbance applying unit 12 at this time, the inside of the separated shear layer (boundary layer L) changes to a turbulent flow and the exchange of kinetic momentums between the high-velocity portion and the low-velocity portion is promoted, so that the low-velocity portion of the boundary layer is accelerated. Since the velocity distribution in the separated shear layer (boundary layer L) is improved, large-scale separation is suppressed, and an air current flows so as to adhere along the wing surface. The boundary layer L which is separated at the separation point P adheres up to the separation point P, apart from the separation point P by the distance ΔD (change from the boundary layer L1 to the boundary layer L2 in FIG. 3). That is, the adhesion distance is increased from D to D' (=D+ΔD).

Here, let us consider a case where the disturbance is applied by the generation of the plasma-induced flow by the discharge caused by the AC voltage. At this time, the plasma-induced flow periodically changes in accordance with a frequency of the AC voltage, so that the vortex is generated. This vortex and a vortex released from the separated shear layer merge with each other, so that the transverse vortices are formed one after another, and due to interference between these transverse vortices, small streamwise vortices are induced. It is thought that the small streamwise vortices thus formed turn the inside of the boundary layer L (separated shear layer) into the turbulent flow and promote the mixture of the kinetic momentums therein, so that the separation is suppressed and the adhesion distance D increases.

Note that the rough surface Sr is formed on the projection 113 as described previously. The rough surface Sr starts from an upstream side of the adhesion distance D which is a distance when the rough surface does not exist, and is formed along the distance X. The rough surface Sr further enhances the effect of the disturbance by the disturbance applying unit 12 and promotes the boundary layer L (separated shear layer) to become the turbulent flow, thereby facilitating the elongation of the adhesion distance of the boundary layer L. However, even when the rough surface Sr is not formed on the projection 113, the elongation of the adhesion distance of the boundary layer L due to the disturbance of the disturbance applying unit 12 is possible. As previously described, the adhesion distance DO in this case (when the rough surface Sr does not exist) is generally smaller than the adhesion distance D when the rough surface Sr exists.

The controller 14 temporally controls states (strength and direction) of the disturbance by the disturbance applying unit 12. Changing the strength and the direction of the disturbance makes it possible to adjust the adhesion distance D. The controller 14 is capable of changing the strength of the disturbance by, for example, controlling a voltage waveform applied to the discharge power source 23.

Figure 5:
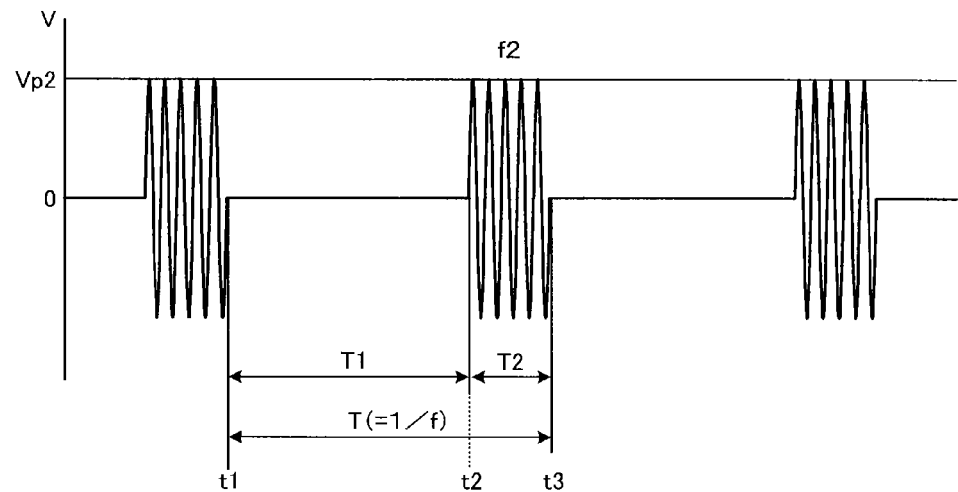
FIG. 5 is a graph showing an example of a drive waveform V of the disturbance applying unit 12.

FIG. 5 shows an example of the voltage waveform (drive waveform of the disturbance applying unit 12) V which is applied between the electrodes 21, 22 in order to periodically change the strength of the disturbance.

The voltage waveform V is a pulse-modulated waveform and an OFF state in a time period T1 and an ON state in a time period T2 are repeated at a period of a frequency f (interval T (=T1 +T2)=1/f). In the OFF state, the voltage is not applied between the electrodes 21, 22 (voltage V1=0 [V]). In the ON state, a high AC voltage with a peak voltage Vp2 and a frequency f2 is applied between the electrodes 21, 22.

Here, the driving state of the disturbance applying unit 12 is expressed as the two states (states 1, 2), that is, the OFF state and the ON state. However, it is only necessary that the magnitudes of the adhesion distance D in the states 1, 2 are different.

In order to produce the magnitude difference, for the states 1, 2, AC voltage waveforms different in peak voltage may be used respectively, for instance. Alternatively, for the states 1, 2, AC voltage waveforms different in frequency may be used respectively.

In this manner, the state (the strength or the direction) of the disturbance by the disturbance applying unit 12 is appropriately set so that the magnitudes of the adhesion distance D in the states 1, 2 become different from each other.

The vortex VR is generated when the disturbance applying unit 12 is driven in the following manner.

First, at a time t1 in FIG. 5, the disturbance applying unit 12 is kept in the state 1 and thereafter, the adhesion distance D becomes in the small state. At a time t2, the disturbance applying unit 12 is changed to the state 2 and thereafter the boundary layer becomes turbulent to get into the adhering state, and the adhesion distance D becomes large. Next, at a time t3, when the disturbance applying unit 12 is changed to the state 1, the boundary layer rapidly becomes laminar to get into the separated state, and the adhesion distance D becomes small again.

Incidentally, as will be shown in a later-described example, there is a certain degree of time lag (about several msec) from the time when the state of the disturbance applying unit 12 changes (time t1, t2, t3) up to the change of the adhesion distance D.

We have found out that the vortex VR corresponding to the dynamic stall vortex DSV is released when the adhesion distance D rapidly changes. Specifically, when the adhesion distance D changes from large to small or from small to large, the vortex VR is released. Further, as the magnitude difference is larger, the stronger vortex VR is released. This vortex VR flows downstream together with the mainstream.

The vortex VR is generated due to dynamic swing of the boundary layer L and corresponds to the dynamic stall vortex DSV. Similarly to the dynamic stall vortex DSV, the vortex VR is a two-dimensional vortex which has an axis perpendicular to the direction in which the fluid F flows and vorticity whose sign is the same as that of vorticity of the separated shear layer. In FIG. 3, the vortex VR is a clockwise vortex having an axis perpendicular to the paper (axis in the wing span direction of the wing member 11). It has been found out from experiments of the present inventors that the clockwise vortex tends to become stronger when the adhesion distance changes from large to small.

By repeating the states 1, 2 as shown in FIG. 5 to change the adhesion distance D in stages, it is possible to continuously release the vortices VR into the boundary layer, in accordance with the change of the adhesion distance D. Here, the example where the states 1, 2 are periodically repeated to continuously release the vortices VR is shown, but the periodic repetition is not necessary depending on the purpose. In order to generate a vortex, the periodic repetition is not necessary, and by changing the adhesion distance D, it is possible to release a vortex at an arbitrary timing.

By thus changing the adhesion distance D in stages, it is possible to release the dynamic stall vortex DSV into the boundary layer at an arbitrary timing without dynamically changing the angle θ of attack of the wing or without any flapping.

By making the vortex VR continuously flow down onto the surface of the wing member 11, various kinds of processes are made possible. For example, it is possible to lift the wing member 11 upward or to make a fluid flow along the surface of the wing member 11. Further, by promoting the mixture of gases, it is possible to increase efficiency of combustion and heat exchange. Further, by breaking a texture structure of a fluid, it is possible to reduce noise or vibration. That is, it is possible to improve efficiency, safety, and comfortability of various kinds of fluid equipment such as a moving body, a combustion engine, and a heat exchanger.

The flow velocity measuring unit 13 is, for example, a Pitot tube and measures a relative velocity vr of the fluid F to the wing member 11.

The controller 14 controls the frequency f (refer to FIG. 5) of the change between the states 1, 2 according to the measured relative velocity vr.

The effect of the vortex VR depends on the number of the vortices VR existing on the wing member 11. The controller 14 finds an advection velocity vi of the vortex VR on the wing member 11 from the measured relative velocity vr and controls the frequency f so that the number of the vortices VR on the wing member 11 becomes appropriate.

For example, a relation between the relative velocity vr and the advection velocity vi is derived from experiments or the like, and a table representing this relation is stored in the controller 14. As a result, the controller 14 is capable of finding the advection velocity vi from the relative velocity vr.

Alternatively, a table representing a relation between the relative velocity vr and the appropriate driving frequency f may be stored in the controller 14. In this case, it is possible to directly decide the frequency f from the relative velocity vr by utilizing this table.

The frequency f may be decided from a pressure (dynamic pressure) or other state quantity of the fluid F on the rear surface of the wing member 11, instead of the relative velocity vr. Alternatively, the advection velocity vi of the vortex VR may be calculated from the pressure (dynamic pressure) or the like of the fluid F instead of the relative velocity vr. In this case, for example, a pressure measuring unit configured to measure the pressure is used instead of the flow velocity measuring unit 13. Alternatively, for example, a table representing a relation between the pressure and the appropriate driving frequency f is stored in the controller 14.

(Second Embodiment)

Figure 6A:
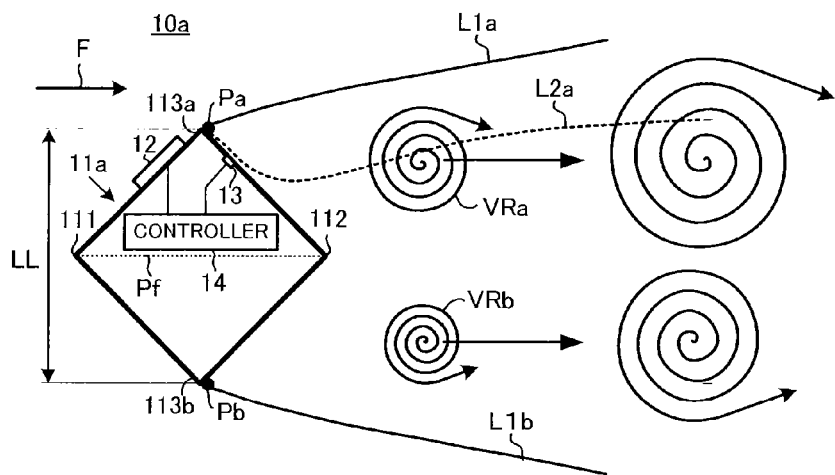
FIG. 6A is a schematic view showing a vortex generating apparatus 10a according to a second embodiment.
Figure 6B:
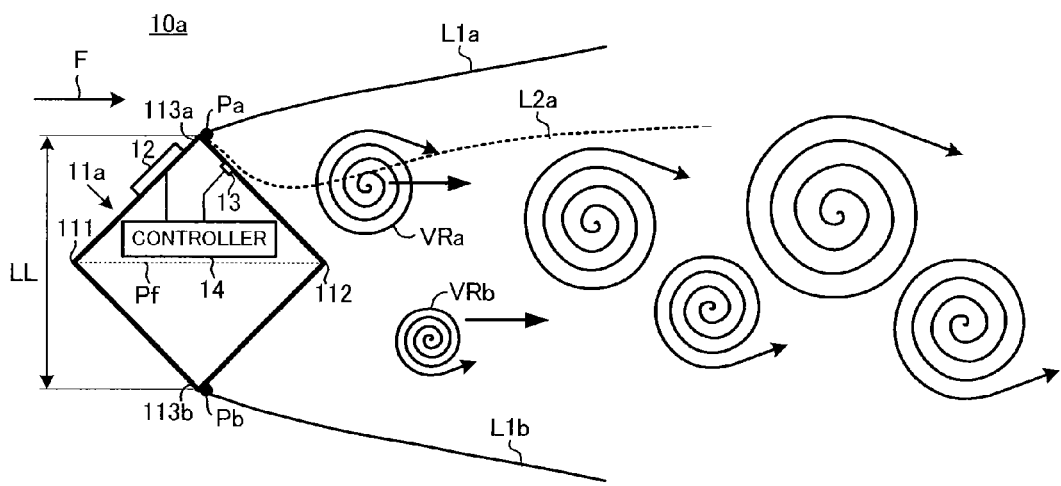
FIG. 6B is a schematic view showing the vortex generating apparatus 10a according to the second embodiment.

FIG. 6A and FIG. 6B show a vortex generating apparatus 10a according to a second embodiment. The vortex generating apparatus 10a has a wing member 11a, a disturbance applying unit 12, a flow velocity measuring unit 13, and a controller 14.

The wing member 11a has a leading edge 111, a trailing edge 112, and projections 113a, 113b.

Two separation points Pa, Pb (corresponding to the projections 113a, 113b) exist in a cross section parallel to a flow of a fluid F. Further, the shape of the wing member 11a including the separation points Pa, Pb is substantially symmetrical with respect to a plane Pf parallel to the flow.

In FIG. 6A and FIG. 6B, the illustration of the rough surface Sr shown in the vortex generating apparatus 10 (refer to FIG. 3) according to the first embodiment is omitted for easier view. In the vortex generating apparatus 10a, the rough surface Sr may also be formed on the wing member 11a to facilitate the adhesion as in the vortex generating apparatus 10. In this case, the rough surface Sr is formed on one or both of the projections 113a, 113b. In the other embodiments which will be described later, the vortex generating apparatus can similarly have the rough surface Sr.

Here, the disturbance applying unit 12 is installed on a surface of the wing member 11 on an upstream side of the separation point Pa, and the disturbance applying unit 12 is not installed on a separation point Pb side. In the same manner as that shown in the first embodiment, it is possible to generate a vortex VRa by changing an adhesion distance D in stages (changing a boundary layer between boundary layers L1 a, L2a) by driving the disturbance applying unit 12. At this time, in accordance with the generation of the vortex VRa, a vortex VRb having vorticity whose direction is opposite the direction of the vortex VRa is generated from a boundary layer L1 b on the separation point Pb side according to the theorem of conservation of angular momentum.

The generated vortices VRa, VRb flow in a downstream direction at a predetermined advection velocity vi. When a distance LL between the separation points Pa, Pb is sufficiently large, the vortices VRa, VRb flow down in parallel to each other, as shown in FIG. 6A. When the distance LL between the separation points Pa, Pb is small, the vortices VRa, VRb form an alternate vortex street as shown in FIG. 6B.

Incidentally, by controlling a frequency f of the change in the disturbance applying unit 12 to stably arrange the vortex street, it is possible to increase the operation by the vortices VRa, VRb and to grow VRa and VRb. When the vortex street is stabilized, the vortices can greatly grow, so that a pressure reduction becomes larger to increase an operation thereof.

Here, let us consider a case where the disturbance applying unit 12 is not provided. In this case as well, vortex structures are formed on the downstream sides of the two separation points Pa, Pb. Then, when the distance LL between the separation points Pa, Pb becomes small, interference occurs on the downstream sides of the separation points Pa, Pb, so that vortices from the separation points Pa, Pb alternately form a vortex street. However, arrangement and strength of these vortices are decided by physical properties and flow velocity of the fluid and the shape of the wing member 11 and cannot be artificially controlled.

(Modification Example)

Figure 7A:
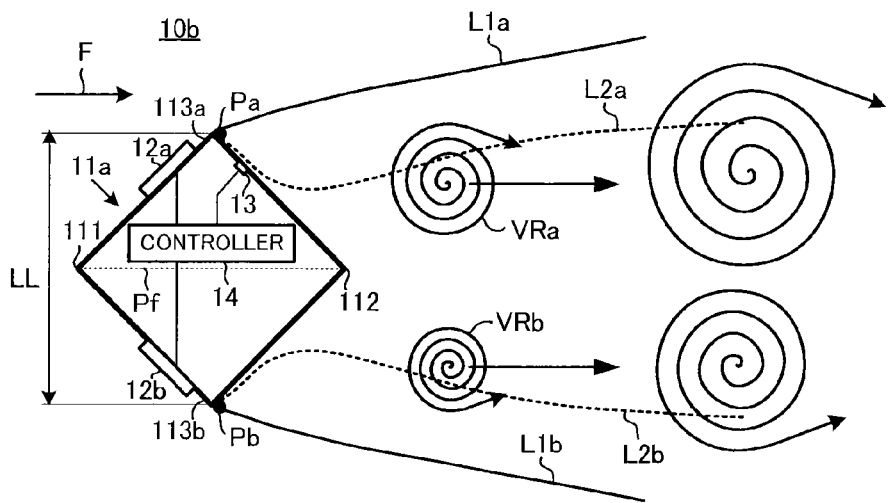
FIG. 7A is a schematic view showing a vortex generating apparatus 10b according to a modification example of the second embodiment.
Figure 7B:
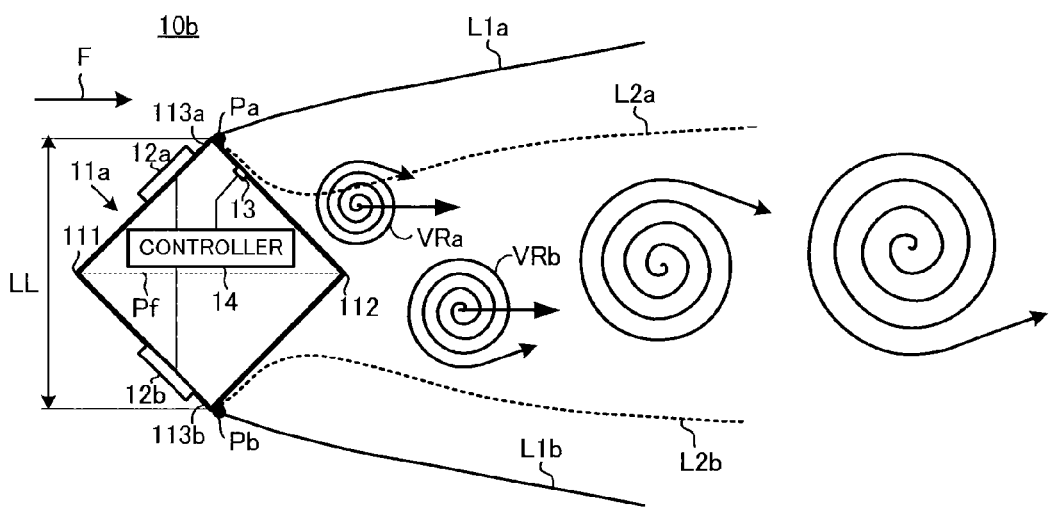
FIG. 7B is a schematic view showing the vortex generating apparatus 10b according to the modification example of the second embodiment.

FIG. 7A and FIG. 7B show a vortex generating apparatus 10b according to a modification example of the second embodiment. The vortex generating apparatus 10b has a wing member 11a, disturbance applying units 12a, 12b, a flow velocity measuring unit 13, and a controller 14.

Here, the disturbance applying units 12a, 12b are disposed on a surface of the wing member 11a on upstream sides of the separation points Pa, Pb respectively. By changing adhesion distances Da, Db in stages by driving the disturbance applying units 12a, 12b respectively, it is possible to release vortices VRa, VRb from the separation points Pa, Pb respectively.

Figure 8:
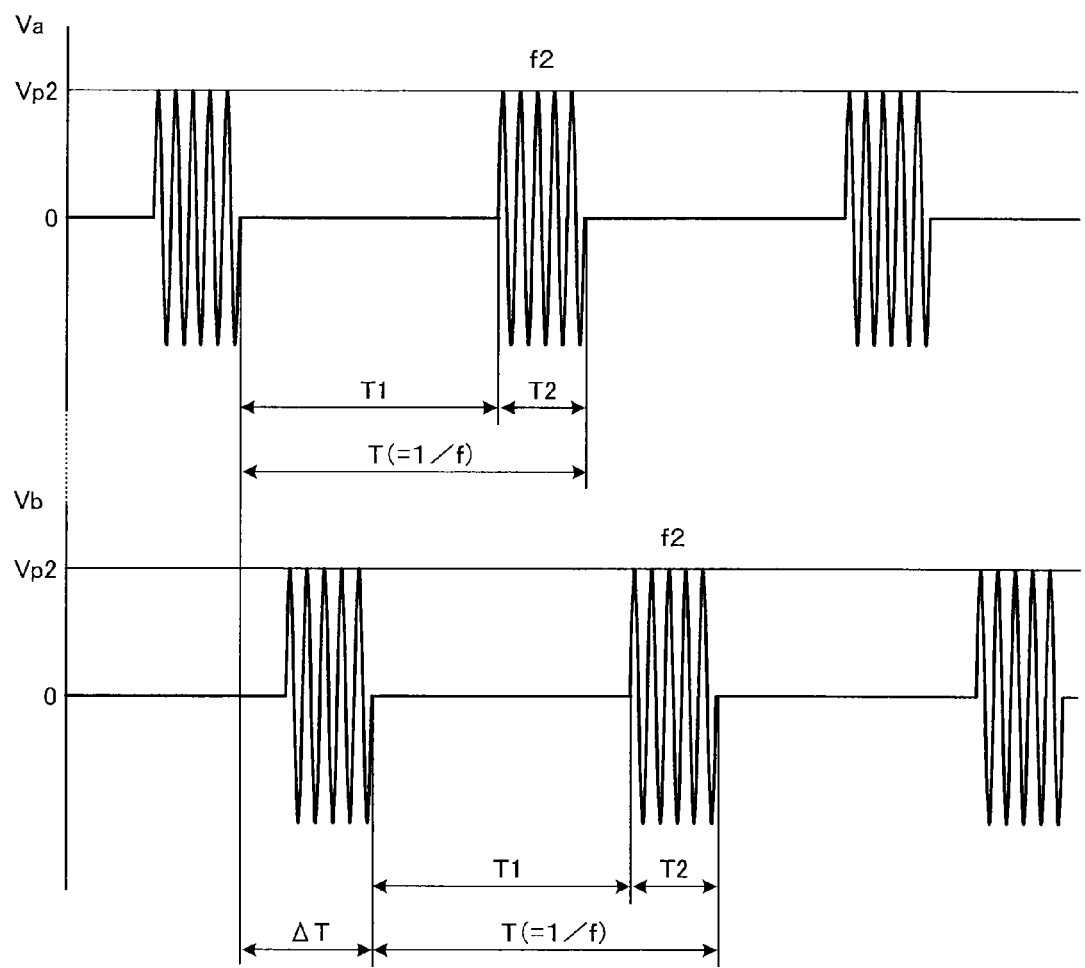
FIG. 8 is a graph showing an example of drive waveforms Va, Vb of disturbance applying units 12a, 12b.

Examples of driving voltage waveforms Va, Vb of the respective disturbance applying units 12a, 12b are shown in FIG. 8. The driving voltage waveform Va is the same as the driving voltage waveform V shown in FIG. 5. The driving voltage waveform Vb is a voltage waveform having a time difference ΔT from the driving voltage waveform Va.

As shown in FIG. 8, the disturbance applying units 12a, 12b preferably change the adhesion distances Da, Db respectively at the same frequency f. That is, by synchronously controlling the disturbance applying units 12a, 12b, it is possible to synchronously generate the vortices VRa, VRb.

Here, by setting the change timings in the disturbance applying units 12a, 12b equal to each other (in a case where the time difference ΔT=0), it is possible to generate the vortices VRa, VRb which are set in parallel as shown in FIG. 7A. Incidentally, if the time difference ΔT in the frequency f is within "0.1/f", the change timings can be thought to be substantially the same.

Further, by making the change timings in the disturbance applying units 12a, 12b different (a case where the time difference Δ≠0), it is possible to form a vortex street of the vortices VRa, VRb as shown in FIG. 7B. By deviating the timings so that the vortex street becomes more stable, it is possible to grow the vortices VRa, VRb to further increase the pressure reduction.

(Third Embodiment)

Figure 9:
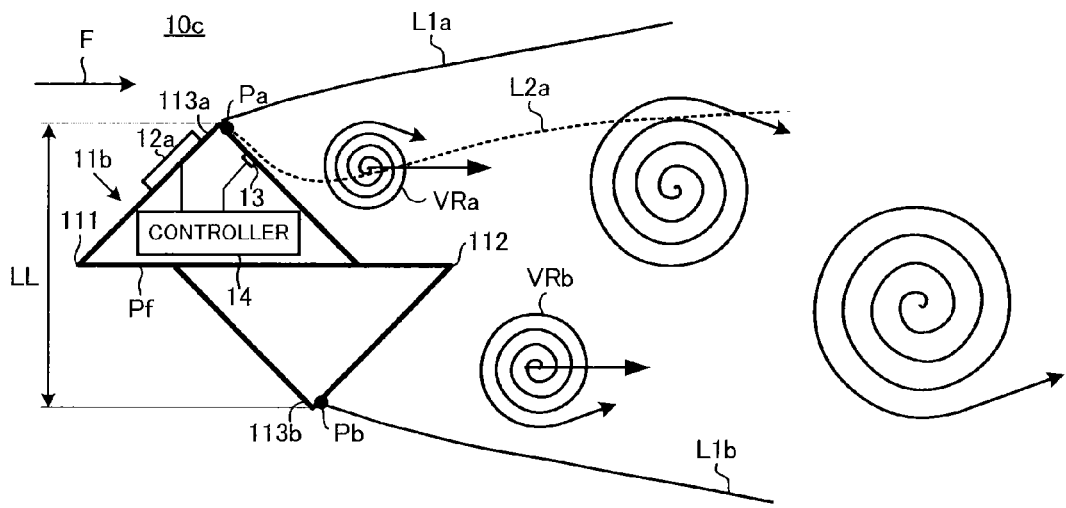
FIG. 9 is a schematic view showing a vortex generating apparatus 10c according to a third embodiment.

FIG. 9 is a view showing a vortex generating apparatus 10c according to a third embodiment. The vortex generating apparatus 10c has a wing member 11b, a disturbance applying unit 12, a flow velocity measuring unit 13, and a controller 14.

The wing member 11b has a leading edge 111, a trailing edge 112, and projections 113a, 113b.

Here, two separation points Pa, Pb (the projections 113a, 113b) exist in a cross section parallel to a flow of a fluid F. However, unlike the second embodiment, the shape of the wing member 11b including the separation points Pa, Pb is not substantially symmetrical with respect to a plane Pf parallel to the flow. That is, distances from the leading edge 111 to the separation points Pa, Pb (or distances from the separation points Pa, Pb to the trailing edge 112) are different. Here, the separation points Pa, Pb (projections 113a, 113b) are disposed on an upstream side and a downstream side respectively.

The disturbance applying unit 12 is installed on a surface of the wing member 11b on an upstream side of the separation point Pa, and the disturbance applying unit 12 is not installed on a separation point Pb side. In the same manner as that shown in the second embodiment, it is possible to generate a vortex VRa by changing an adhesion distance D in stages (changing a boundary layer between boundary layers L1 a, L2 a) by driving the disturbance applying unit 12. At this time, in accordance with the generation of the vortex VRa, a vortex VRb having vorticity whose direction is opposite that of the vortex VRa is generated from a boundary layer L1 b on the separation point Pb side according to the theorem of conservation of angular momentum.

The generated vortices VRa, VRb flow in a downstream direction at a predetermined advection velocity vi. Distances from generation positions of the vortices VRa, VRb to the trailing edge 112 are different. Therefore, when the vortices VRa, VRb flow down at the same advection velocity vi, it becomes easy to form a regular vortex street in a wake flow.

Incidentally, by controlling a frequency f of the change in the disturbance applying unit 12, it is possible to stably arrange the vortex street.

(Modification Example)

Figure 10:
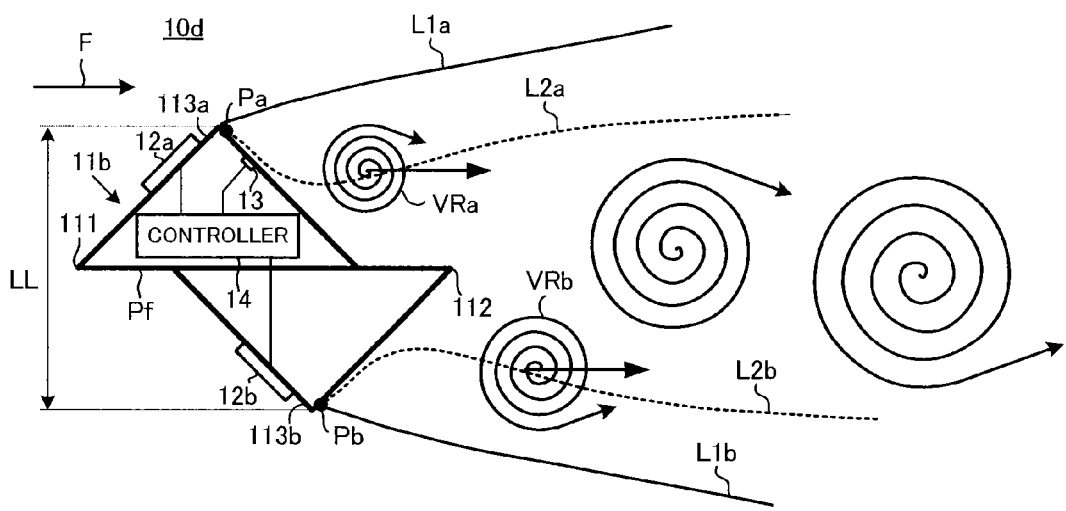
FIG. 10 is a schematic view showing a vortex generating apparatus 10d according to a modification example of the third embodiment.

FIG. 10 shows a vortex generating apparatus 10d according to a modification example of the third embodiment. The vortex generating apparatus 10d has a wing member 11b, disturbance applying units 12a, 12b, a flow velocity measuring unit 13, and a controller 14.

Here, the disturbance applying units 12a, 12b are disposed on a surface of the wing member 11b on upstream sides of the separation points Pa, Pb respectively. By driving the disturbance applying units 12a, 12b by drive waveforms Va, Vb respectively to change adhesion distances Da, Db in stages respectively, it is possible to release vortices VRa, VRb from the separation points Pa, Pb respectively.

Here, even when the change timings in the two disturbance applying units 12a, 12b are the same (a case where a time difference ΔT=0), it is possible to form a regular vortex street downstream because the distances from the generation points of the vortices VRa, VRb to the trailing edge 112 are different.

(Fourth Embodiment)

Figure 11:
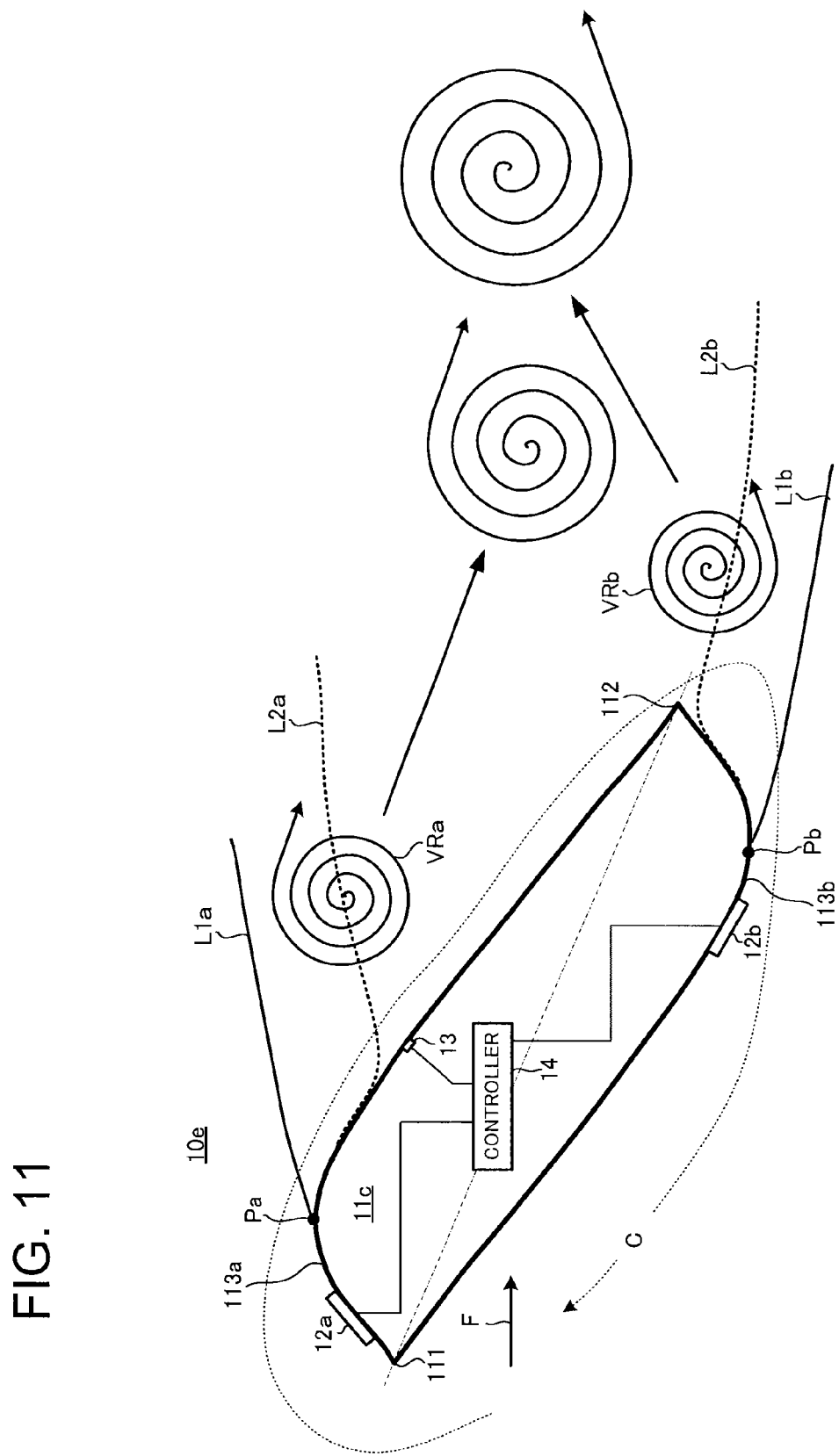
FIG. 11 is a schematic view showing a vortex generating apparatus 10e according to a fourth embodiment.

FIG. 11 is a view showing a vortex generating apparatus 10e according to a fourth embodiment. The vortex generating apparatus 10e has a wing member 11c, disturbance applying units 12a, 12b, a flow velocity measuring unit 13, and a controller 14.

The wing member 11c has a leading edge 111, a trailing edge 112, and projections 113a, 113b. The wing member 11c has a substantially rectangular cross section having the projections 113a, 113b in a curved shape.

separation points Pa, Pb (corresponding to the projections 113a, 113b) exist in a cross section parallel to a flow of a fluid F. The shape of the wing member 11c including the separation points Pa, Pb is not substantially symmetrical with respect to a plane parallel to the flow. That is, distances from the leading edge 111 to the separation points Pa, Pb (or distances from the separation points Pa, Pb to the trailing edge 112) are different. Here, the separation points Pa, Pb (projections 113a, 113b) are disposed on an upstream side and a downstream side respectively.

By installing the disturbance applying units 12a, 12b on the separation points Pa, Pb sides and changing adhesion distances Da, Db in stages, it is possible to release vortices VRa, VRb into boundary layers.

Incidentally, by installing the disturbance applying unit 12 only on one of the separation points Pa, Pb sides to change one of the adhesion distances Da, Db in stages, it is possible to release one of the vortices VRa, VRb in the boundary layer. At this time, in accordance with the release of one of the vortices VRa, VRb, the other of the vortices VRa, VRb is generated according to the theorem of conservation of angular momentum.

The vortex VRa generated from the upstream separation point Pa has an effect of lifting the wing member 11c upward. On the other hand, the vortex VRb generated from the downstream separation point Pb has an effect of increasing circulation C around the wing member 11c when an angle θ of attack is small. Therefore, when the angle θ of attack is small and the upstream separation point Pa does not exist, it is significant to drive the disturbance applying unit 12b to generate the vortex VRb.

In the foregoing embodiments, it is described that the application of the disturbance increases the adhesion distance D of the flow. Here, according to the findings of the present inventors, even the application of the disturbance does not sometimes result in the partial adhesion of the flow especially in a high Reynolds number region. However, even in this case, it is possible to promote the exchange of the kinetic momentums near the boundary layer due to the influence of the transverse vortices generated by the disturbance applying unit 12, and to attract the boundary layer seen in time average closer to a wall surface. In this case, the "adhesion distance" described hitherto does not necessarily represent a distance along which the adhesion takes place, but indicates a distance along which the fluid is attracted, that is, an "attraction distance". By temporally changing the magnitude of the attraction distance by the disturbance applying unit 12, it is possible to generate a vortex at an arbitrary timing as in the embodiments described hitherto.

It is conceivable to change the separated state to the adhering state by using an apparatus similar to the disturbance applying unit 12 to realize an improvement of a dynamic lift and so on. An object of the above-described embodiments is not a change itself of the separated state to the adhering state but is to release the dynamic stall vortex to the separation region in a controlled state to obtain the effect by the vortex. For example, under a condition where the Reynolds number is low, by setting an airfoil used in an aircraft to an angle of attack immediately after the stall angle and operating the disturbance applying unit 12 at the leading edge, it is possible to change the flow in the separated state into the adhering state to obtain a high dynamic lift. A conventional aim was to continue this adhering state as long as possible. An object of the above-described embodiments is to control the change between the separated state and the adhering state by intermittently driving the disturbance applying unit 12 even in such a case, and lift up the wing in a direction of the dynamic stall vortex by using the pressure reduction of the dynamic stall vortex generated at this time.

(Modification Example 1)

Figure 12A:
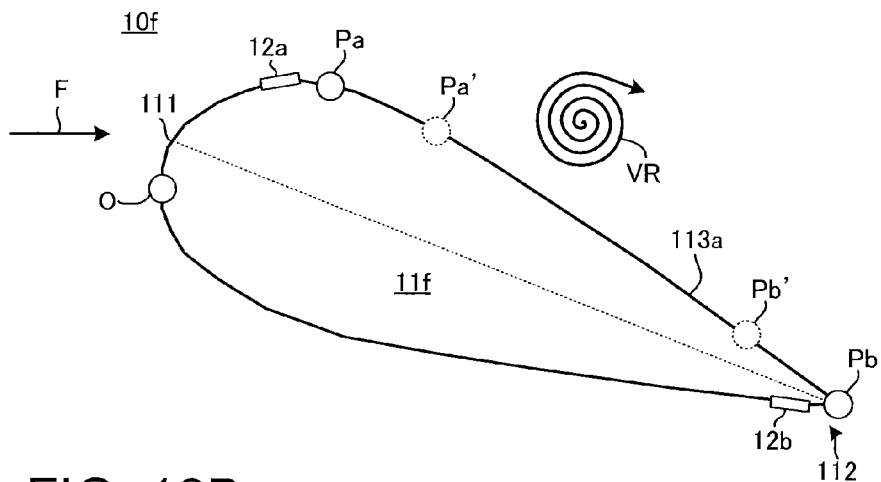
FIG. 12A is a schematic view showing a vortex generating apparatus 10f according to a modification example 1.

FIG. 12A shows a vortex generating apparatus 10f according to a modification example 1. The vortex generating apparatus 10f has a wing member 11f and disturbance applying units 12a, 12b. Note that the illustration of a controller 14 is omitted.

In FIG. 12A, the shape of a cross section, of the wing member 11f, parallel to a flow of a fluid F is shown. The wing member 11f has a leading edge 111 having a relatively rounded shape, a trailing edge 112 having a relatively sharp shape, and curve-shaped projections 113a, 113b connecting the leading edge and the trailing edge. On a periphery of the cross section, it has one stagnation point O at which the fluid F flows in and two separation points Pa, Pb, and on downstream sides of the separation points Pa, Pb, separation regions follow.

The stagnation point O is disposed near the leading edge 111. However, the position of the stagnation point O changes depending on an angle of attack of the wing member 11f to the flow and does not necessarily agree with the leading edge 111. The separation point Pa is a place at which the flow on the projection 113a of the wing member 11f separates and is disposed on the projection 113a. The position of the separation point Pa changes depending on the angle of attack of the wing member 11f to the flow. The separation point Pb is a place at which the flow on the projection 113b of the wing member 11f separates. The position of the separation point Pb agrees with the trailing edge 112 irrespective of the angle of attack of the wing member 11f to the flow.

The disturbance applying unit 12a is disposed on an upstream side of the separation point Pa. When the disturbance applying unit 12a is driven, a disturbance is applied to the flow, so that the disturbance is introduced to a boundary layer. As a result, the boundary layer of the flow partly adheres, and the separation point displaces from the point Pa to a downstream point Pa'. Consequently, an adhesion distance OPa from the stagnation point O to the separation point is elongated to an adhesion distance OPa'. Further, when the driving of the disturbance applying unit 12a is stopped, the separation point displaces from Pa' to Pa. Consequently, the adhesion distance OPa' from the stagnation point to the separation point is shortened to the adhesion distance OPa.

According to the elongation or shortening of the adhesion distance D, the boundary layer swings, and consequently, a vortex (dynamic stall vortex) VR having an axis in a wing span direction of the wing member 11f is generated in an separation region of the fluid.

Since the vortex VR is in a pressure-reduced state as compared with the fluid therearound, an attracting force works between the vortex VR and the wing member 11f. By using this attracting force, it is possible to attract the wing member 11f in a direction of the vortex VR or attract the flow in a direction of the wing member 11f in a time zone when the vortex VR flows down near the wing member 11f.

By intermittently and repeatedly controlling the disturbance applying unit 12a, it is possible to continue to intermittently generate the vortices VR. When the state where the intermittent generation of the vortices VR is continued is seen in time average, the attracting force works in time average between the vortex VR and the wing member 11f. As a result, in time average, it is possible to attract the wing member 11f in the direction of the vortex VR or to attract the flow in the direction of the wing member 11f.

These operations make it possible to temporally change a dynamic force and a drag working on the wing member 11f and to temporally change a moment. Further, it is possible to deflect the flow and to change the size of the separation region in a wake flow.

Further, when the disturbance state is intermittently changed as described above, there are a control method to set a time interval of the intermittent control to a constant value, a control method to periodically change the time interval, and a control method to perform control by temporally changing the time interval. In the former case, it is possible to generate periodic vibration or noise. In the latter case, it is possible to suppress periodic vibration or noise and at the same time obtain its time average effect and to broaden a spectrum of originally existing periodic vibration or noise. The adhesion distance may be changed by a change between two states 1, 2, instead of by driving and stopping.

The disturbance applying unit 12b is disposed on an upstream side of the separation point Pb. When the disturbance applying unit 12b is driven, the disturbance is applied to the flow, so that turbulence is introduced to the boundary layer. As a result, the boundary layer of the flow partly adheres, and the separation point displaces from the point Pb to a downstream point Pb'. Consequently, an adhesion distance OPb from the stagnation point O to the separation point is elongated to an adhesion distance OPb'. Further, when the driving of the disturbance applying unit 12b is stopped, the separation point displaces from Pb' to Pb. Consequently, an adhesion distance OPb' from the stagnation point O to the separation point is shortened to the adhesion distance OPb.

As described above, it is possible to release a vortex VR also from a trailing edge 112 side. The effect of this vortex VR is as described above. By adjusting an interval of the vortices released from the two separation points so that the vortices VR can exist most stably, it is possible to promote the growth of the vortices VR to obtain a larger effect, as previously described.

Here, the case where the vortex generating apparatus 10f has both the disturbance applying units 12a, 12b is described, but the vortex generation apparatus 10f may have only one of the disturbance applying units 12a, 12b.

(Modification Example 2)

Figure 12B:
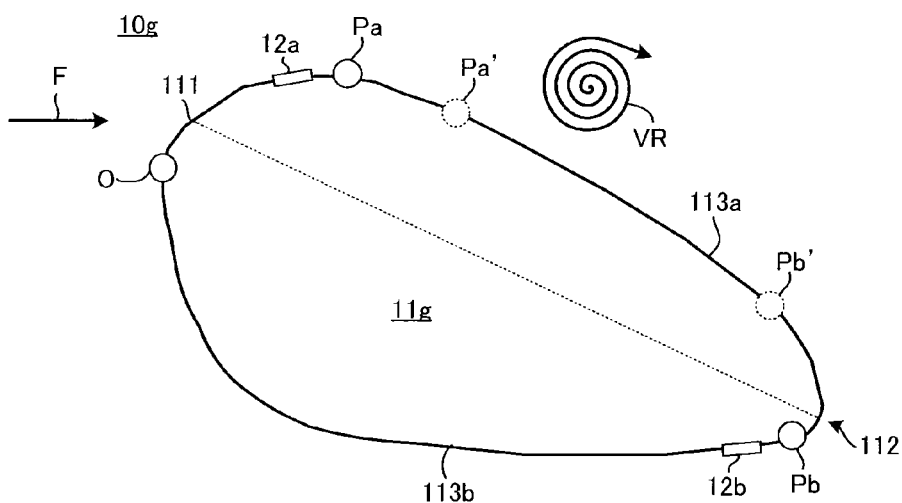
FIG. 12B is a schematic view showing a vortex generating apparatus 10g according to a modification example 2.

FIG. 12B shows a vortex generating apparatus 10g according to a modification example 2. The vortex generating apparatus 10g has a wing member 11g and disturbance applying units 12a, 12b. Note that the illustration of a controller 14 is omitted.

In FIG. 12B, the shape of a cross section, of the wing member 11g, parallel to a flow of a fluid F is shown. The wing member 11g has a leading edge 111 having a relatively rounded shape, a trailing edge 112 having a relatively rounded shape, and curve-shaped projections 113a, 113b connecting the leading edge and the trailing edge. On a periphery of the cross section, it has one stagnation point O at which the fluid F flows in and two separation points Pa, Pb, and on downstream sides of the separation points Pa, Pb, separation regions follow.

The stagnation point O is disposed near the leading edge 111. However, the position of the stagnation point O changes depending on an angle of attack of the wing member 11g to the flow and does not necessarily agree with the leading edge 111. The separation point Pa is a place at which the flow on the projection 113a of the wing member 11g separates and is disposed on the projection 113a. The position of the separation point Pa changes depending on the angle of attack of the wing member 11g to the flow. The separation point Pb is a place at which the flow on the projection 113b of the wing member 11g separates and is disposed on the projection 113b. The position of the separation point Pb changes depending on the angle of attack of the wing member 11g to the flow.

The vortex generation apparatus 10g is the same as the vortex generation apparatus 10f except that the position of the separation point Pb changes depending on the angle of attack of the wing member 11g to the flow.

(Modification Example 3)

Figure 12C:
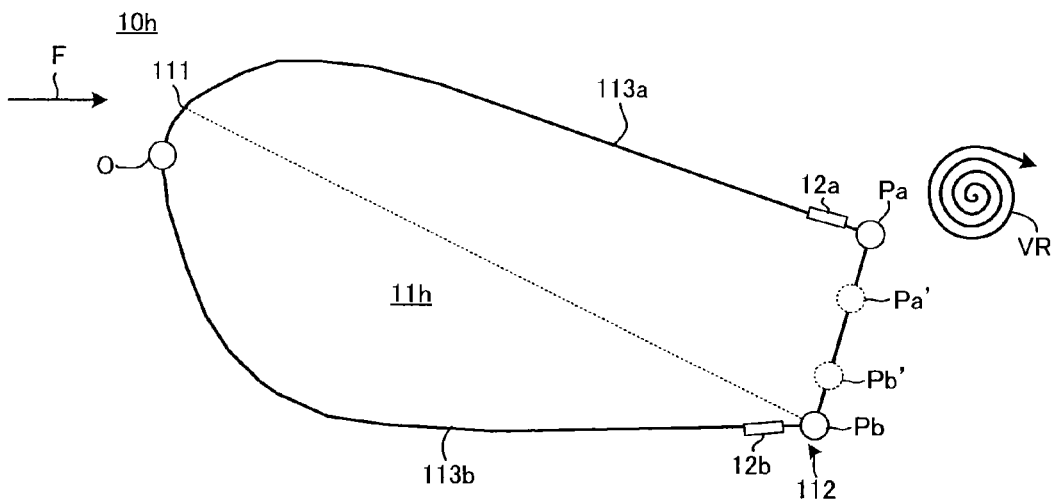
FIG. 12C is a schematic view showing a vortex generating apparatus 10h according to a modification example 3.

FIG. 12C shows a vortex generating apparatus 10h according to a modification example 3. The vortex generating apparatus 10h has a wing member 11h and disturbance applying units 12a, 12b. Note that the illustration of a controller 14 is omitted.

In FIG. 12C, the shape of a cross section, of the wing member 11h, parallel to a flow of a fluid F is shown. The wing member 11h has a leading edge 111 having a relatively rounded shape and a trailing edge 112 having a relatively angulated shape. A projection 113a of the wing member 11h has a substantially curved shape connecting the leading edge 111 and the trailing edge 112, but has a corner portion (part of a periphery of the cross section has a kinked line shape). A projection 113b of the wing member 11h has a curved shape connecting the leading edge 111 and the trailing edge 112.

Irrespective of an angle of attack of the wing member 11f to a flow, a position of a separation point Pa is fixed to the corner portion of the projection 113a. A position of a separation point Pb is fixed to the trailing edge 112 irrespective of the angle of attack of the wing member 11f to the flow.

The vortex generating apparatus 10h is the same as the vortex generating apparatus 10g except that the positions of the separation points Pa Pb are fixed irrespective of the angle of attack of the wing member 11h to the flow. Since the separation points Pa, Pb are fixed, installation positions of the disturbance applying units 12a, 12b and a rough surface can be decided based on their distances from the separation points Pa, Pb.

In the above modification examples, the examples where the position of the stagnation point O changes depending on the angle of attack is shown. On the other hand, even when the position of the stagnation point O does not change depending on the angle of attack, it is possible to exhibit the same effects as those of these modification examples. For example, in a wing member having an acute-angled tip, the position of the stagnation point O does not change depending on the angle of attack.

EXAMPLE

An example will be described. FIG. 13A to FIG. 13F are views chronologically showing states when a vortex VR is generated by using a wing member 11 and a disturbance applying unit 12 which uses discharge.

The wing member 11 is disposed in (a cavity of) a flow of the air (atmosphere) with a 10 m flow velocity. At this time, an angle θ of attack=25° and a stall angle α=18°.

Here, an ON state with a duration T2 (8 msec) and an OFF state with a duration T1 (72 msec) were repeated at an interval T (=T1 +T2=80 msec=1/f=1/12.5 Hz) between electrodes 21, 22.

ON state: application of a sine wave (voltage Vp2=4.5 kV, frequency f2=15 kHz)

OFF state: no voltage application

By using PIV (Particle Image Velocimetry), a flow of a fluid around the wing member 11 was measured.

FIG. 13A to FIG. 13F correspond to times=−5, 0, 5, 10, 12, 15 ms respectively from a start time of the ON state.

Figure 13A:
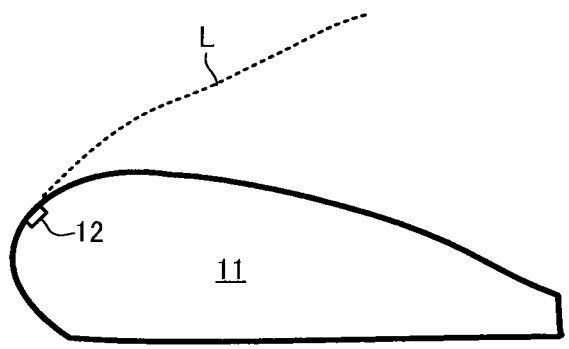
FIG. 13A is a view showing the result of a vortex generation experiment in a wing member 11.
Figure 13B:
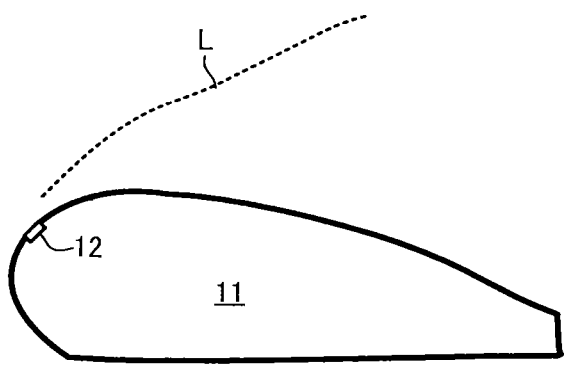
FIG. 13B is a view showing the result of a vortex generation experiment in the wing member 11.

(1) At instants before and when the ON state is started (t=−5 ms, 0 ms), a boundary layer L is separated from the wing member 11 and a separated shear layer is generated because the angle θ of attack is larger than the stall angle α (refer to FIG. 13A and FIG. 13B).

Figure 13C:
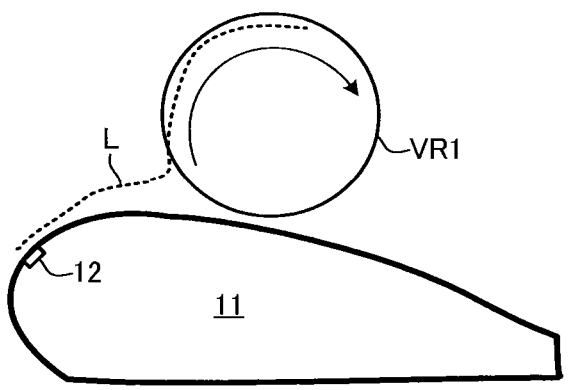
FIG. 13C is a view showing the result of a vortex generation experiment in the wing member 11.

(2) At an instant when 5 ms pass after the start of the ON state (t=5 ms), the boundary layer L adheres to the wing member 11 (refer to FIG. 13C). That is, in accordance with a change of an adhesion distance D from small to large, a vortex VR1 is generated.

Figure 13D:
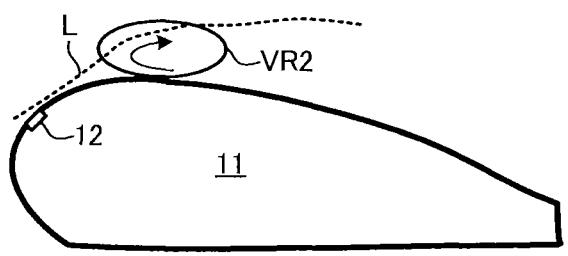
FIG. 13D is a view showing the result of a vortex generation experiment in the wing member 11.

(3) At an instant when 10 ms pass from the start of the ON state (t=10 ms), the adhesion distance D becomes larger, and a vortex VR2 is generated (refer to FIG. 13D). It is thought that the vortex VR1 has flowed away.

Figure 13E:
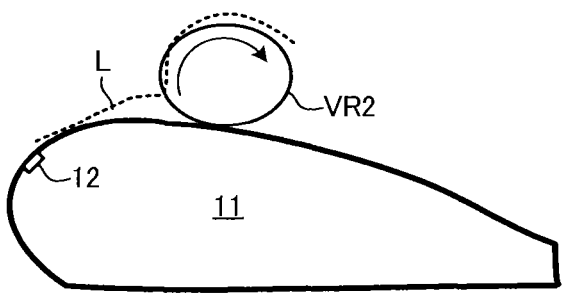
FIG. 13E is a view showing the result of a vortex generation experiment in the wing member 11.

(4) At an instant when 12 ms pass from the start of the ON state (t=12 ms), the adhesion distance D becomes still larger, and the vortex VR2 is growing (refer to FIG. 13E).

Figure 13F:
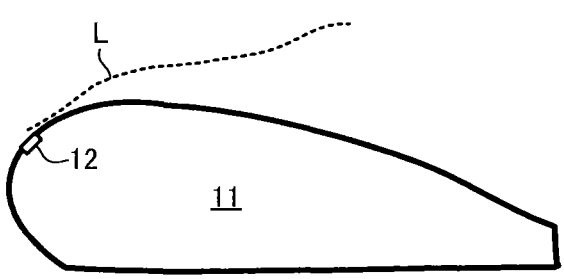
FIG. 13F is a view showing the result of a vortex generation experiment in the wing member 11.

(5) At an instant when 15 ms pass from the start of the ON state (t=15 ms), the vortex VR2 has flowed downstream and is not seen (refer to FIG. 13F).

As described above, it has been found out that by changing the adhesion distance D by the discharge, it is possible to generate the vortex VR.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vortex generating method, comprising:
    disposing a wing in a flow of a fluid to form a stagnation point and a first and a second separation points on a periphery of a cross section of the wing parallel to the flow, at the stagnation point the fluid flowing in, and the first and the second separation points being followed by a first and a second separation region respectively;
    while the wing has an attack angle larger than a static stalling angle, applying a disturbance to an upstream side of the first separation point to cause part of a boundary layer of the flow to adhere; and
    while the wing has the attack angle larger than the static stalling angle, controlling the application of the disturbance to change a position of the first separation point, change an adhesion distance from the stagnation point to the first separation point, and swing the boundary layer to generate a vortex corresponding to a dynamic stall vortex, the vortex corresponding to the dynamic stall vortex having an axis in a wing span direction of the wing.

2. The vortex generating method according to claim 1, wherein the disturbance is applied by a disturbance applying unit, the disturbance applying unit comprises:
    a first electrode configured to be in contact with the fluid;
    a second electrode configured to be in contact with the fluid via a dielectric; and
    a power source configured to apply a voltage between the first and second electrodes to generate discharge between the first and second electrodes.

3. The vortex generating method according to claim 2, wherein the first and second electrodes are disposed on the upstream side and a downstream side or on the downstream side and the upstream side of the flow of the fluid respectively.

4. The vortex generating method according to claim 1, wherein the disturbance is applied by a disturbance applying unit, the disturbance applying unit comprises:
    a vibration generator configured to apply vibration to the fluid; and
    a power source configured to cause the vibration generator to generate the vibration.

5. The vortex generating method according to claim 1, wherein the disturbance is applied by a disturbance applying unit, the disturbance applying unit comprises:
    an acoustic wave generator configured to apply an acoustic wave to the fluid; and
    a power source configured to cause the acoustic wave generator to generate the acoustic wave.

6. The vortex generating method according to claim 1, wherein the vortex corresponding to the dynamic stall vortex has an axis perpendicular to a direction of the flow and vorticity whose sign is the same as a sign of vorticity in the boundary layer, the same sign meaning the same rotation directions of vorticity.

7. The vortex generating method according to claim 1, wherein the wing is attracted to the vortex corresponding to the dynamic stall vortex having a pressure less than fluid around the vortex corresponding to the dynamic stall vortex, when the vortex corresponding to the dynamic stall vortex passes near the wing.

8. The vortex generating method according to claim 1, wherein the fluid, which has a pressure less than fluid around the vortex corresponding to the dynamic stall vortex, is attracted to the wing when the vortex corresponding to the dynamic stall vortex passes near the wing.

9. The vortex generating method according to claim 1, wherein the controlling the application of the disturbance intermittently generates a plurality of vortices, thereby reducing a wake flow region.

10. The vortex generating method according to claim 1, wherein the controlling the application of the disturbance intermittently generates a plurality of vortices, thereby reducing a fluid noise.

11. The vortex generating method according to claim 1, wherein the controlling the application of the disturbance intermittently generates a plurality of vortices different in interval.

12. A vortex generating method, comprising:
    disposing a wing in a fluid and forming a state where a boundary layer of a flow of the fluid is separated and is not adhering, between a separation point and a trailing edge of the wing;
    while the wing has an attack angle larger than a static stalling angle, applying a disturbance to the boundary layer of the flow at or on an upstream side of the separation point to cause adhesion of the boundary layer and changing an adhesion distance from the separation point;
    while the wing has the attack angle larger than the static stalling angle, generating a vortex corresponding to a dynamic stall vortex in the fluid in accordance with the change of the adhesion distance; and
    while the wing has the attack angle larger than the static stalling angle, controlling to intermittently apply the disturbance to the upstream side of the separation point of the fluid on a surface of the wing having the separation point so as to generate the vortex corresponding to the dynamic stall vortex.

13. The vortex generating method according to claim 12, wherein the disturbance is applied by applying a voltage between a first electrode in contact with the fluid and a second electrode in contact with the fluid via a dielectric to cause discharge between the first and second electrodes.

14. The vortex generating method according to claim 12, wherein the disturbance is applied by applying vibration or an acoustic wave to the fluid.

* * * * *